(12) United States Patent
Jablonski

(10) Patent No.: US 6,374,014 B1
(45) Date of Patent: Apr. 16, 2002

(54) FIBER GRATING PACKAGE

(75) Inventor: Edward Joseph Jablonski, Cockeysville, MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/550,650

(22) Filed: Apr. 17, 2000

(51) Int. Cl.⁷ .................................................. G02B 6/34
(52) U.S. Cl. ........................................................ 385/37
(58) Field of Search .................................. 385/37, 10

(56) References Cited

U.S. PATENT DOCUMENTS

| | | | |
|---|---|---|---|
| 5,073,004 A | * 12/1991 | Clayton et al. | 385/27 |
| 5,305,336 A | * 4/1994 | Adar et al. | 372/18 |
| 5,894,533 A | * 4/1999 | Heise et al. | 385/14 |
| 5,987,200 A | * 11/1999 | Fleming et al. | 385/37 |
| 6,144,789 A | * 11/2000 | Engelberth et al. | 385/37 |
| 6,181,851 B1 | * 1/2001 | Pan et al. | 385/37 |
| 6,188,705 B1 | * 2/2001 | Krainak et al. | 372/32 |
| 6,240,220 B1 | * 5/2001 | Pan et al. | 385/13 |

* cited by examiner

*Primary Examiner*—Hemang Sanghavi
*Assistant Examiner*—Scott Knauss
(74) *Attorney, Agent, or Firm*—David L. Soltz; Michael R. Cammarata

(57) ABSTRACT

A fiber grating package which substantially reduces Bragg wavelength variations resulting from axial strain on a fiber. The package includes a fiber segment including a Bragg grating. The segment is fixed between two points separated by a distance less than the length of the segment. As a result, the grating is bent to allow bending or rotation of the segment in response to changes in the relative positions of the ends of the fiber segment. In one embodiment, the package may include a temperature control structure and control electronics for heating the grating to a stable desired temperature using temperature feedback. Electronic control can be internal or external to the package depending size requirements for the package.

25 Claims, 7 Drawing Sheets

FIBER GRATING PACKAGE

FIELD OF THE INVENTION

The present invention relates in general to optical filters, and in particular to a fiber grating package for reducing wavelength variations in optical gratings.

BACKGROUND OF THE INVENTION

Fiber Bragg gratings (hereinafter referred to also as "fiber gratings" or simply "gratings") are well known and widely used in a variety of optical applications. In general, a fiber grating is formed by providing a periodic variation in the refractive index of the core of an optical fiber. The periodic variations or gratings in the fiber core cause reflection of a particular Bragg wavelength given by $\lambda_B=2n\Lambda$, where n is the mean refractive index of the grating, and $\Lambda$ is the grating period. All other incident wavelengths are transmitted through the grating.

Thus, it is well known that by choice of n and $\Lambda$, a fiber grating may be effectively utilized as an optical filter for filtering a desired wavelength from an optical signal. In fact, due to their narrow pass band and relatively inexpensive cost to produce, fiber gratings have developed as key components of many fiber optic communication systems where wavelength or channel selection is critical. Fiber gratings are, for example, widely used for channel selection in wavelength division multiplexed (WDM) or dense wavelength division multiplexed (DWDM) communication systems, wherein a plurality of distinct optical wavelengths or channels are multiplexed and propagated over an optical medium to a plurality of receivers. In these systems, the channels or wavelengths chosen for transmission, as well as the channel spacings, are selected to correspond to an International Telecommunication Union (ITU) channel grid, wherein channel spacing may be, for example, 50 or 100 GHz. Reliable selection of a particular ITU channel from a WDM signal is essential to proper functionality of a WDM system.

One difficulty associated with the use of fiber gratings for channel selection relates to variations of resulting from axial strain, i.e. compression or tension, on the fiber including the grating. It is also known that n and $\Lambda$ is temperature-dependent. Variations of n and $\Lambda$ result in corresponding variations in the Bragg wavelength, and thus can significantly effect wavelength selection in a system incorporating a fiber grating.

Several fiber grating compensation schemes have been proposed and attempted for minimizing the effects of axial strain and/or temperature variation on the Bragg wavelength of a grating. To date, however, each of the known approaches to providing compensation for axial strain and/or temperature variations have failed to provide a sufficiently reliable and cost-effective device.

Accordingly, there is a need in the art for a fiber grating package that efficiently and reliably obviates the effects of axial strain the Bragg wavelength of a fiber grating. There is also a need in the art for a fiber grating package that provides reliable compensation for temperature dependency of the Bragg wavelength. There is a further need in the art for art for a fiber grating package, which may be efficiently and cost-effectively produced, minimized power consumption, and is of minimized size.

SUMMARY OF THE INVENTION

The present invention is organized about the concept of providing a fiber grating package that substantially reduces Bragg wavelength variations resulting from axial strain on a fiber. The package includes a fiber segment including a Bragg grating. The segment is fixed between two points separated by a distance less than the length of the segment. As a result, the grating is bent to allow bending or rotation of the segment in response to changes in the relative positions of the ends of the fiber segment. In one embodiment, the package may include a temperature control structure and control electronics for heating the grating to a stable desired temperature using temperature feedback. Electronic control can be internal or external to the package depending size requirements for the package.

In particular, a fiber grating package consistent with the invention includes a housing with a segment of optical fiber having a Bragg grating region fixed thereto. The fiber segment has a first end fixed in a first location on the housing and a second end fixed in a second location on the housing. The shortest distance between the first location and the second location is less than the length of the segment, the segment thereby being bent into an arcuate shape between the first and second locations. Fixing of the segment at both ends of the housing isolates the segment from external axial strain. The bending of the segment between the first and second locations allows for rotation or bending in response to relative movement between the first and second locations. Axial strain on the fiber is, therefore, significantly reduced.

The first and second ends may be fixed to the housing by respective glass capillaries. The capillaries may be disposed in respective strain relief assemblies, which are fixed to the housing. In one embodiment, the housing includes top and bottom housing portions. The capillaries or the strain relief assemblies may be disposed in respective slots in the top and bottom housing portions. The housing may include a slot therein in which the segment is disposed. The slot may be formed in the top housing portion, and may be in a j-shape.

According to another aspect of the invention, the package may include a temperature control structure disposed at least partially in the housing. The temperature control structure may have a resistive heating trace disposed thereon, and a heat spreader may be thermally coupled to the resistive heating trace. The Bragg grating region may be disposed adjacent the heat spreader to allow heating of the Bragg grating region to a desired temperature. The fiber segment may be disposed in a slot formed in the heat spreader, e.g. an s-slot.

The temperature control structure may extend outward from the housing to allow connection of control electronics for controlling current flow through the heating trace. The control electronics may be configured to control the current flow through the heating trace based on a resistance across a thermistor disposed on the temperature control structure adjacent the Bragg grating region. The heat spreader and a portion of the temperature control structure including the resistive heating trace may be disposed in an associated pocket in the bottom housing portion. The control electronics may, however, be disposed on the temperature control structure, and the temperature control structure may be disposed entirely within the housing.

BRIEF DESCRIPTION OF THE DRAWING

For a better understanding of the present invention, together with other objects, features and advantages, reference should be made to the following detailed description which should be read in conjunction with the following figures wherein like numerals represent like parts.

DETAILED DESCRIPTION OF THE INVENTION

Figure 1:
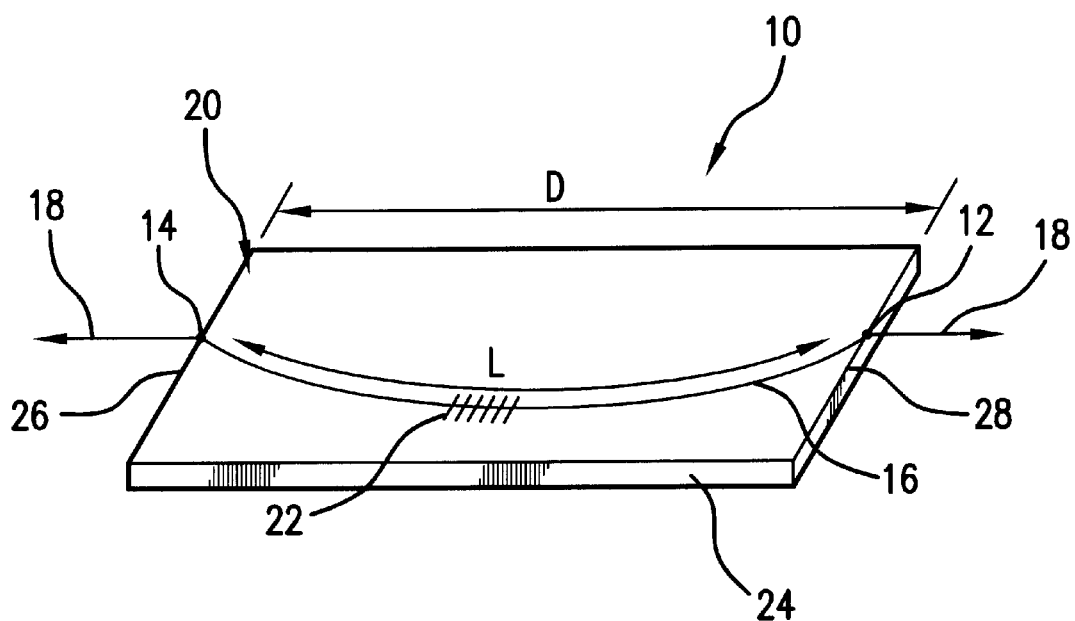
FIG. 1: is a perspective-view illustration of an exemplary fiber grating package consistent with the present invention.

FIG. 1 illustrates an exemplary embodiment of a fiber optic grating package 10 consistent with the invention. As shown, the package 10 may include a housing 20 to which the ends 12, 14 of a grating segment 16 of an optical fiber 18 are secured. The grating segment 16 includes a Bragg grating 22 formed therein.

Those skilled in the art will recognize that the fiber 18, fiber segment 16 and the fiber grating 22 have been depicted in highly simplified form. Typically, an optical fiber includes a fiber cladding surrounding a fiber core, which may be, for example, germania-doped fused silica. The grating includes a portion of a fiber having periodic variations in the refractive index of the core. As will be recognized by those skilled in the art, the grating reflects a significant portion of the optical signal traveling on the fiber at wavelengths in a very narrow range around a center or Bragg wavelength, $\lambda_B = 2n\Lambda$, as discussed above. Substantially all other wavelengths are transmitted through the grating.

The housing 20 may be constructed in a variety of manners from a variety of materials. A primary purpose of the housing is to provide a secure location for fixing the ends 12, 14 of the fiber segment 16 to prevent linear and rotational movement of the ends 14, 16 relative to the housing 20. By securing the ends to the housing, the fiber segment 16 is isolated from axial strain (compression or tension) imparted to the fiber 18. In the illustrated exemplary embodiment, the housing is a flat rectangular plate 24, and the ends of the fiber segment are fixed at opposite ends 26,28 thereof. The ends 12, 14 may be fixed to the housing 20 by a variety of means, e.g. by epoxy or by mechanical means using capillaries, as will be described below in connection with additional exemplary embodiments.

Advantageously, the shortest distance D between the locations on the housing 20 where the ends 12, 14 of the segment are fixed is less than the length L of the fiber segment 16. As a result, the fiber segment 16 is bent into an arcuate shape. In the embodiment illustrated in FIG. 1, for example, the segment 16 has a continuous curvature between its ends 12, 14, which are fixed to the housing. In other exemplary embodiments, as will be described in detail below, the fiber may be bent into an s-shape or j-shape.

In any embodiment, however, bending of the fiber segment 16 provides significant advantages. In particular, any relative motion between the fixed ends 12, 14 of the segment, which may result, for example, from thermal expansion or contraction of the housing 20, causes rotation and/or bending of the fiber segment 16 without creating substantial axial strain on the segment 16. As discussed above, it is known that axial strain on a grating can significantly effect the Bragg wavelength of the grating. Thus, fixing the fiber segment 16 between two locations separated by a distance less than the length of the segment 16 to thereby cause a bend in the segment, substantially reduces Bragg wavelength variations associated with axial strain.

Figure 2:
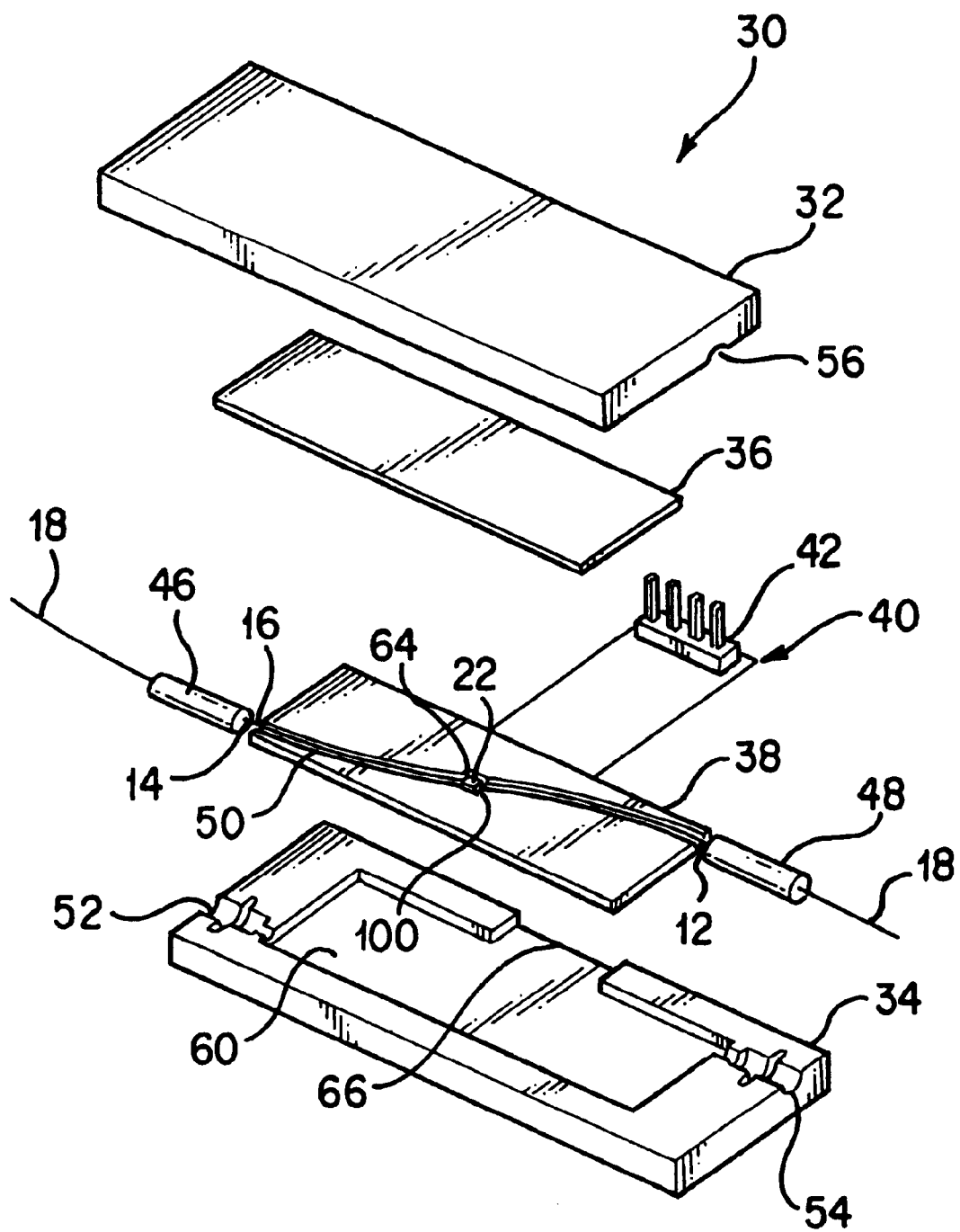
FIG. 2: is an exploded, perspective-view illustration of another exemplary fiber grating package consistent with the present invention.
Figure 3:
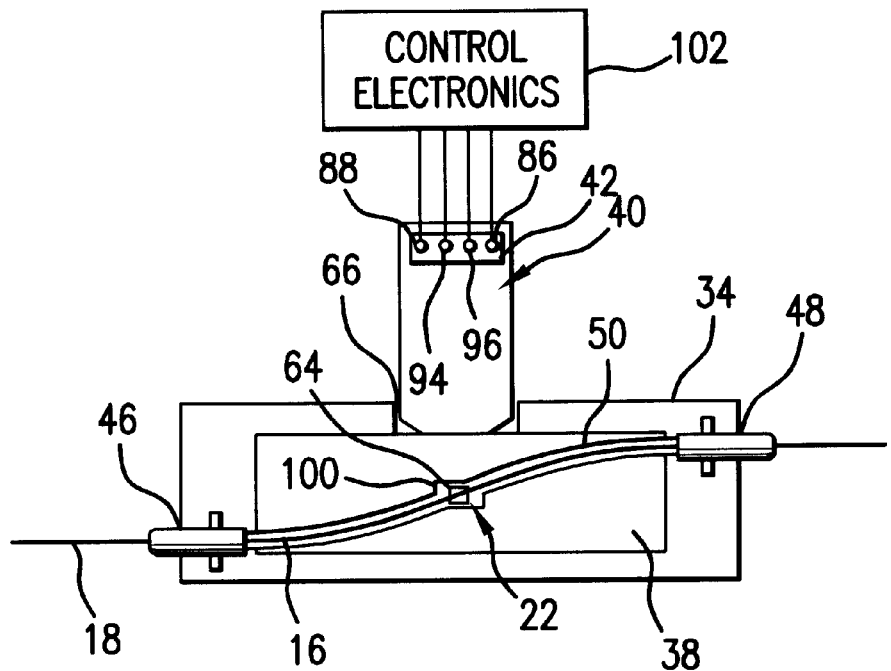
FIG. 3: is a top-view illustration of the exemplary fiber grating package illustrated in FIG. 1, wherein the top housing portion and top heat spreader have been removed.

Turning now to FIGS. 2 and 3, there is illustrated another exemplary fiber optic grating package 30 consistent with the invention. As shown, the package 30 includes a housing 31 including top 32 and bottom 34 insulating housing portions, top 36 and bottom 38 heat spreaders, and a temperature control structure 40 with an input/output connector 42 connected thereto. Both ends 12, 14 of the fiber segment 16 are secured to the housing by respective glass capillaries 46, 48. An s-shaped slot 50 for receiving the fiber segment 16 and the grating 22 formed therein is formed in the bottom heat spreader 34.

As discussed above, the Bragg wavelength of the grating 22 varies with temperature due to the temperature dependency of n and $\Lambda$, and also with axial strain on the fiber segment 16 on which the grating is formed. In the embodiment illustrated in FIG. 2, the grating 22 is maintained at a substantially constant temperature to eliminate substantial changes in the Bragg wavelength due to temperature variation. In addition, the fiber segment 16 is disposed within the s-shaped slot with its ends fixed to the housing portions 32,34 by the capillaries 46, 48. The shortest distance between the capillaries is thus less than the length of the fiber segment 16, and the segment is bent into an s-shape. The s-shaped bend in the fiber 16 allows for rotation or bending of the segment in the event that there is relative motion between the capillaries 46,48 resulting from the thermal expansion or contraction of the capillaries and/or the portions of the package 30 to which they are affixed. Advantageously, bending or rotation of the fiber segment 16 significantly limits axial strain on the segment 16, thereby substantially limiting the Bragg wavelength variation of the grating 22 included therein.

In the exemplary embodiment of FIG. 2, the top 32 and bottom 34 insulating housing portions are preferably formed from a thermally insulating, low coefficient of thermal expansion (CTE) of material. In one embodiment, the insulating housing portions 32, 34 may be constructed from syntactic foam, available, for example, from CMT Materials, Inc. of Dedham, Mass. Other materials such as ceramic may also be used. Those skilled in the art will recognize that the housings may be machined or molded to the required shape.

The housing portions 32,34 may include generally planar exterior surfaces. The top surface of the bottom insulating housing portion 34 and the bottom surface of the top insulating housing portion may include grooves for receiving the glass capillaries 46, 48. As shown, the bottom housing portion 34 includes a first groove 52 for receiving the first capillary 46 and a second groove 54 for receiving the second capillary 48. The top insulating housing portion 32 includes corresponding first and second grooves corresponding to the grooves 52,54 in the bottom housing portion. In the perspective view of FIG. 1, however, only the groove 56 in the top housing for receiving the capillary 48 is shown.

In the illustrated exemplary embodiment, the grooves in the top and bottom housing portions for receiving the capillaries 46,48 are semi-cylindrical so that substantially equal portions of the capillary are disposed in corresponding grooves, e.g. grooves 56, 54, in the top and bottom housing portions, respectively. It will be recognized by those skilled in the art however that the position of the capillaries relative to either of the housing portions may be modified so that a larger portion of one or both of the capillaries is disposed in one of the top and bottom housing portions. Advantageously, the grooves are dimensioned to conform to the exterior surfaces of the capillaries so that in the assembly the capillaries are trapped in a fixed position relative to the top and bottom housing portions.

With continued reference to FIG. 2 and also to FIG. 3, the bottom insulating housing portion in the package 30 includes a rectangular central pocket 60 dimensioned to receive the bottom copper heat spreader 38 and a heating portion 62 (FIG. 4) of the temperature control structure 40 on which a thermistor 64 is mounted, as will be described in detail below. In the illustrated embodiment the temperature control structure 40 extends from the exterior of the package 30 to the interior through a notch 66 in the bottom insulating housing.

Figure 4:
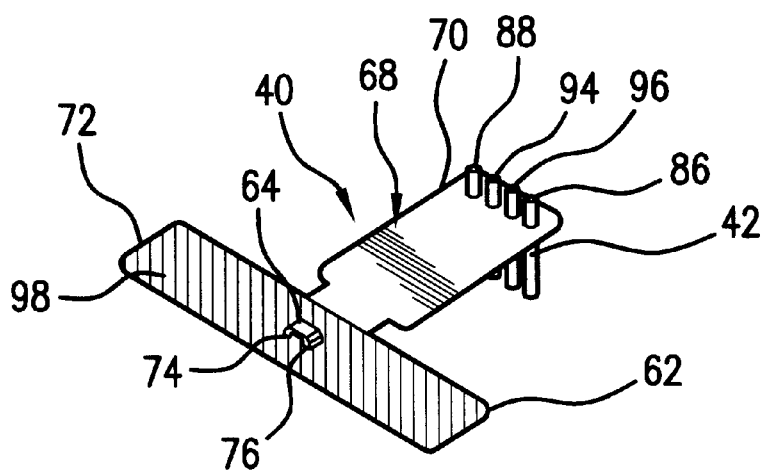
FIG. 4: is a perspective-view illustration of the temperature control structure, thermistor, and input/output connector illustrated in FIG. 1.

As illustrated in FIG. 4, the temperature control structure 40 may include a generally t-shaped substrate 68 with a first portion 70 having an input/output connector 42 secured to end thereof and a heating portion 72 perpendicular to the first portion 70, as shown. The thermistor 64 may be mounted centrally on the heating portion 72, e.g., on associated solder pads 74,76. The thermistor 64 may be a conventional negative temperature coefficient chip thermistor, such as an 805-package chip thermistor, available, for example, from Vishay-Dale, Inc.

It is well known that a negative temperature coefficient thermistor exhibits a resistance that decreases with increasing temperature. The 805-package chip thermistor, for example, has a 10 KΩ resistance at 25° C., and a predictable decreased resistance with increases in temperature. Although a negative temperature coefficient chip thermistor is used in the illustrated exemplary embodiment, those skilled in the art will recognize that a wide variety of thermistors, as well as other methods of providing temperature feedback, will be useful in connection with the present invention.

Figure 5:
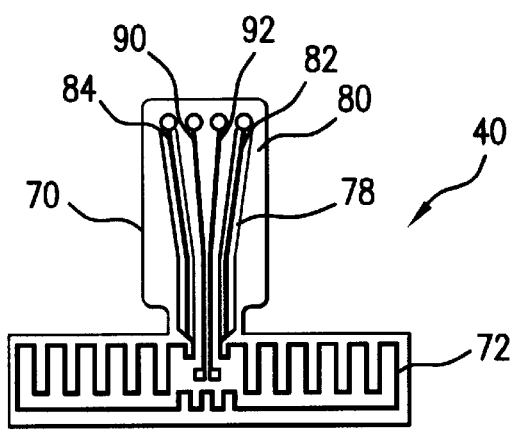
FIG. 5: is a bottom-view illustration of the temperature control structure illustrated in FIG. 1.

With continued reference to FIG. 4 and also to FIG. 5, the temperature control structure 40 further includes a plurality of conductive traces on a bottom surface 80 thereof. A resistive heating trace 78 has first 82 and second 84 ends electrically connected to first 86 and second 88 heater leads on the input/output connector 42. The heating trace 78 extends from the first heater lead 86 across the first portion 70 and in a serpentine pattern on both sides of the heating portion 72 and returns across the first portion 70 to the second heater lead 88. The portions of the trace 78 traversing the first portion 70 may be electrically conductive, whereas the portions disposed on the heating portion 72 may be resistive to provide a heating element. Connecting the first 86 and second 88 heater leads across a voltage potential thus causes current flow through the resistive heating trace 78 to cause heat dissipation in the resistive trace on the heating portion 72. First 90 and second 92 thermistor traces extend from associated leads (not shown) on the thermistor 64 to first 94 and second 96 thermistor leads. The first 94 and second 96 thermistor leads are thus connected across the thermistor 64 for providing temperature feedback to associated control electronics based on the resistance presented by the thermistor.

The top surface 98 of the heating portion 72 is secured to the bottom surface of the bottom heat spreader 34 using, for example, a pressure sensitive adhesive. Heat dissipation from resistive heating trace is thus thermally coupled to the heater spreader 34 in an efficient manner. The thermistor 64 extends into a window 100 formed through the bottom heat spreader 34. To enable accurate measurement of the temperature in the area of the thermistor and the window in the heat spreader, the thermistor 64 may be thermally coupled to the heat spreader 34 by an epoxy.

Thus, in the package 30 the temperature control structure 40 extends perpendicularly from the bottom heat spreader 34 to allow access to the pins on the input/output connector 42 at a position outside of the package housing. This positioning facilitates positioning of control electronics outside of the package 30, and allows for a minimized package size. It will be recognized by those skilled in the art that the dimensions and geometry of the temperature control structure 40 may be modified to position the input/output connector 42 at a location convenient for connection to associated control electronics.

Advantageously, the fiber 18 is securely fixed within the glass capillaries 46, 48. The capillaries 46, 48 in turn are epoxied or otherwise secured to the insulating housing portions 32, 34 at opposite ends of the package and at opposite corners of the rectangular bottom heat spreader 38. The fiber segment 16 is thus disposed loosely in the slot 50 to allow bending or rotation of the segment, while the ends 12, 14 of the segment are fixed to the housing by the capillaries 46, 48. The grating 22 formed in the segment 16 is disposed directly above the thermistor 64. As shown the thermistor 64, the window 100, and the grating 22 are therefore centrally disposed in the bottom heat spreader 34.

In the illustrated embodiment, the bottom heat spreader 34 is constructed from a flat sheet of copper having a thickness of about 0.040 inches, a width of about 0.625 inches and a length of about 1.875 inches. The s-slot 50 may have a depth of about 0.020 inches and a width of about 0.062 inches, and the displacement between the capillaries 46, 48 at opposite ends of the heat spreader 34 may be about 0.30 inches. Those skilled in the art will recognize that the above dimensions are provided for illustrative purposes only, and that the dimensions may be varied depending on the particular application, intended use, etc.

Figure 6:
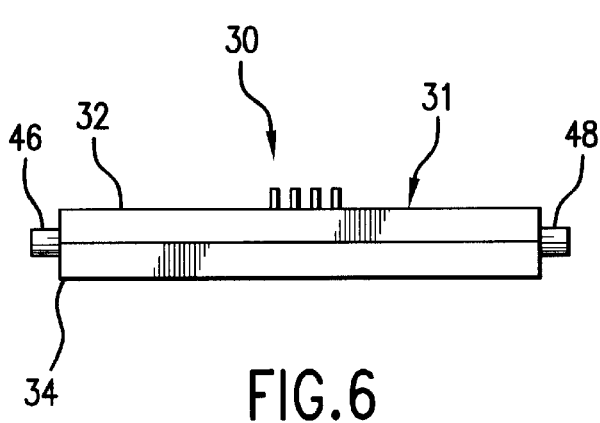
FIG. 6: is a side-view illustration of the exemplary fiber grating package illustrated in FIG. 1.
Figure 7:
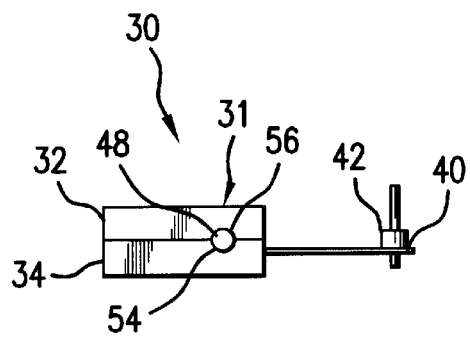
FIG. 7: is an end-view illustration of the exemplary fiber grating package illustrated in FIG. 1.

In the package 30 a top copper heat spreader 36 is disposed over the bottom heat spreader 34, thereby trapping the fiber segment 16 between the top 36 and bottom heat spreaders 34. Again, the dimensions of the various elements in the package 10 may vary, however in one embodiment the top heat spreader 36 has length and width dimensions equal to the bottom heat spreader 34 and has a thickness of about 0.20 inches. As shown for example in FIGS. 6 and 7 the assembly is completed with the top insulating housing 32 disposed over the top heat spreader and in engagement with corresponding surfaces of the bottom insulating housing 34. The capillaries 46, 48 are thus positioned in corresponding capillary slots, e.g. slots 56, 54, in the top and bottom insulating housing portions. The top insulating housing portion 32 and bottom insulating housing portion 34 may be joined using an epoxy to securely enclose the heat spreaders 34, 36, the fiber segment 16, and the thermistor 64.

In operation, external control electronics 102 connected to the input/output connector 42 use the resistance across the thermistor 64 as feedback to control the temperature of the package immediately adjacent the grating 22. In particular, the control electronics are configured to supply a controlled input, e.g. on the heater leads 88, 86, to the resistive trace 78 to heat the heat spreaders 38, 36. Feedback from the thermistor 64 on leads 94, 96, i.e. sensed resistance across the thermistor, is used by the control electronics 102 to appropriately adjust the input and maintain the temperature in the area of grating 22 at a substantially constant value.

Those skilled in the art will recognize that the control electronics 102 can be realized in a variety of embodiments. For example, the control electronics may include a processor circuit for allowing a user defined grating temperature to be maintained. The processor may be configured to measure the resistance across the thermistor 64 as a feedback signal and adjust the grating temperature by, for example, pulse with modulation of the heating input to the temperature control structure. Alternatively the electronics can be configured with an internal reference to establish a set grating temperature. The electronics can also be configured to provide data communication to and from the processor to allow communication of temperature data, alarm conditions, etc. from the processor.

The capillaries 46, 48 isolate the fiber segment 16 from axial strain imposed from outside the package. However, as the segment 16 is heated to a desired temperature, a mismatch between the CTEs of the glass capillaries 46, 48, the insulating housings 32, 34, and the heat spreaders 36, 38 can cause relative movement between the capillaries 46, 48. Advantageously, the s-shaped bend in fiber segment 16 allows the segment to bend or rotate in response to relative movement between the capillaries, thereby substantially reducing axial strain related to such movement. Bragg wavelength variations in the grating 22 resulting from axial strain are thus substantially reduced by the package 30.

Figure 8:
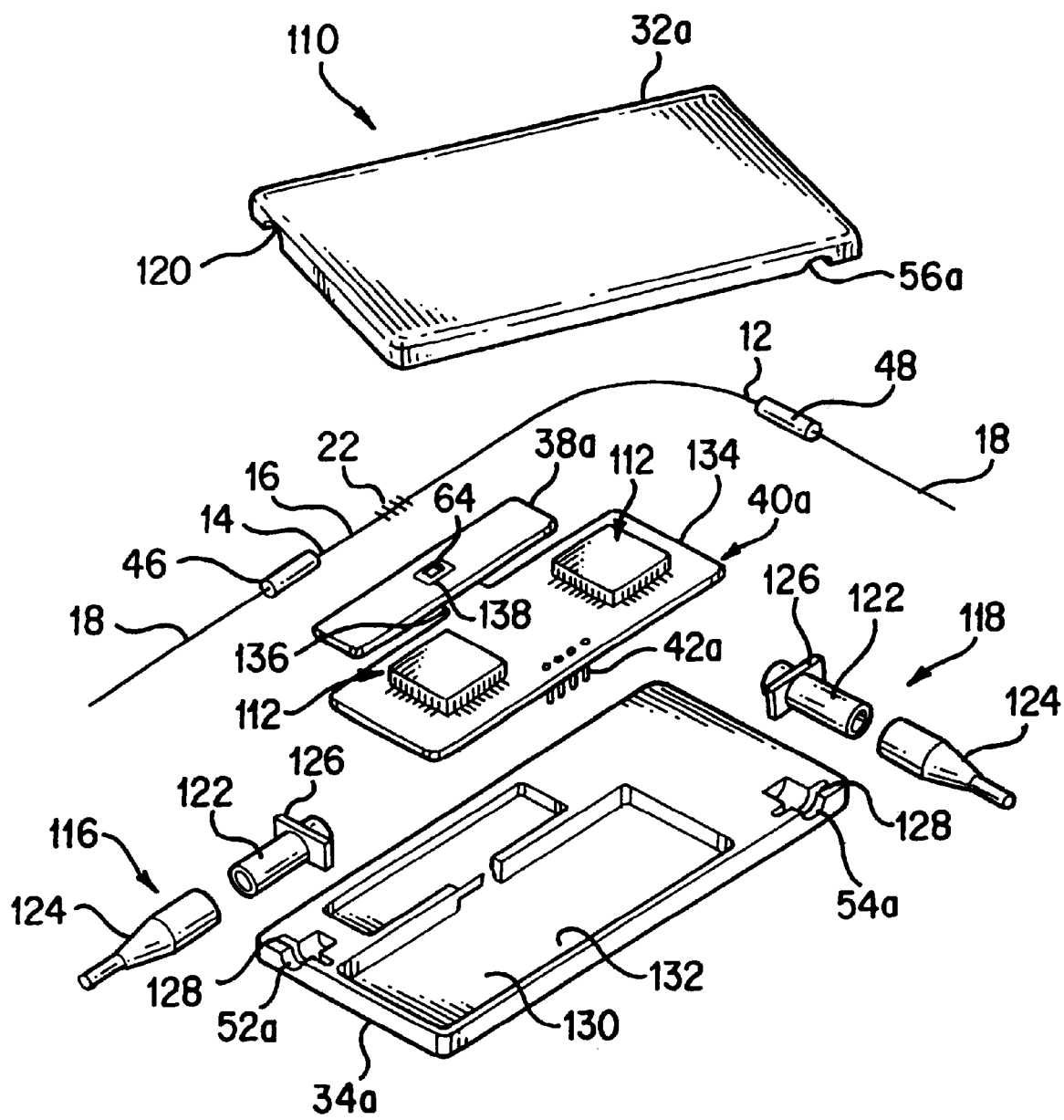
FIG. 8: is an exploded, perspective-view illustration of yet another exemplary fiber grating package consistent with the present invention.
Figure 9:
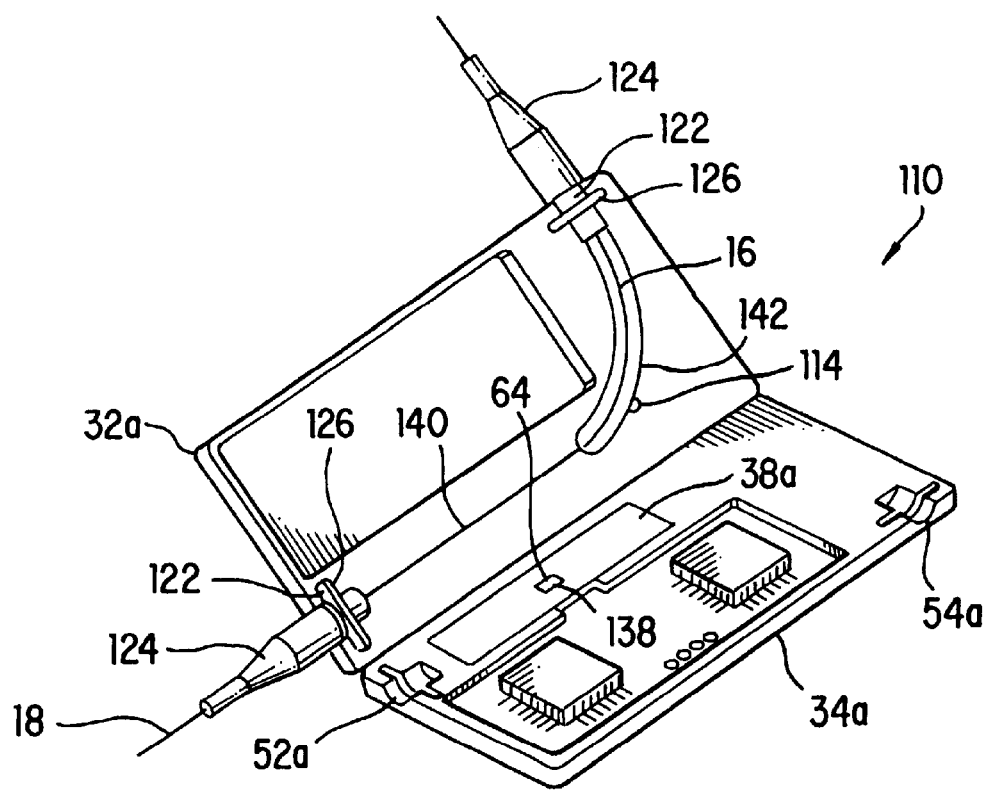
FIG. 9: is a perspective-view illustration of the exemplary fiber grating package illustrated in FIG. 8, wherein the top housing portion has been separated from the bottom housing portion to show the interior of the package.
Figure 10:
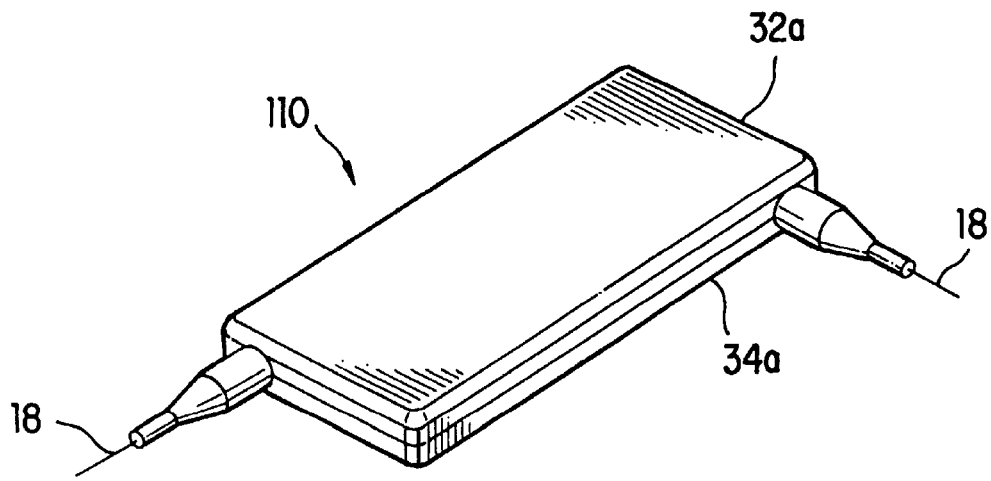
FIG. 10: is a perspective-view illustration of the fiber grating package illustrated in FIG. 8.

Another alternative embodiment 110 of a grating package consistent with the invention is illustrated in FIGS. 8–10. In the package 110 the temperature control structure 40*a* and control electronics 112 are disposed within the package housing formed by top 32*a* and bottom 34*a* housing portions, and the fiber segment 16 is disposed in a j-shaped slot 114 in the housing. As shown in FIGS. 8 and 9, the package includes top 32*a* and bottom 34*a* insulating housing portions, a heat spreader 38*a*, and a temperature control structure 40*a* with control electronics 112 and input/output connector 42*a* connected thereto. Both ends 12, 14 of the fiber segment 16 are secured to the housing by respective glass capillaries 46, 48, which are received within respective strain relief assemblies 116, 118. The j-shaped slot 114 for receiving the fiber segment 16 and the grating 22 formed therein is formed in top insulating housing portion 32*a*.

The shortest distance between the capillaries 46, 48 is less than the length of the fiber segment 16, and the segment is maintained in a j-shape by the slot 114. The j-bend in the fiber 16 allows for rotation or bending of the segment in the event that there is relative motion between the capillaries 46, 48 resulting from the thermal expansion or contraction the various portions of the package 30 to which they are affixed. Advantageously, bending or rotation of the fiber segment 16 significantly limits axial strain on the fiber segment 16, thereby substantially limiting the Bragg wavelength variation of the grating 22 associated therewith.

The top 32*a* and bottom 34*a* insulating housing portions may be formed in the same manner as the housing portions 32, 34 for the package 30. Grooves 52*a*, 54*a*, 56*a*, 120 for receiving the strain relief assemblies 116, 118 are formed in the top 32*a* and bottom 34*a* housing portions. Each strain relief assembly includes a capillary receiving portion 122 in which a respective one of the capillaries is received, and connecting portion 124 which mates with the capillary receiving portion 122. The fiber 18 passes through the capillaries 46, 48 and through the associated connecting portions 124 to provide strain relief. The capillary receiving portions 122 may include rectangular stabilizers 126 from an exterior surface therefrom. The stabilizers 126 may be received in associated stabilizer grooves 128 in the top and bottom insulating housings for preventing linear or rotational movement of the capillary receiving portions 122 and the associated capillaries 46, 48 therein relative to the housing.

As shown in FIG. 8, the bottom insulating housing in the package 110 includes a pocket 130 dimensioned to receive the generally h-shaped temperature control structure 40*a* and the bottom copper heat spreader 38*a* attached thereto. In the package 110, therefore, the temperature control structure 40*a* and the control electronics 112 mounted thereon are maintained entirely within the package housing. The input/output connector 42*a* extends from the temperature control structure through an opening 132 in the bottom housing portion 34*a* to the exterior of the housing.

The generally h-shaped temperature control structure 40*a* includes a first portion 134 having the input/output connector and control electronics secured to thereto, and a heating portion parallel thereto and separated therefrom by a bridge portion 136. A thermistor 64 may be mounted centrally on the heating portion, e.g., on associated solder pads (not shown). As in the package 30, the temperature control structure 40*a* includes a resistive heating trace disposed on the heating portion for causing heat dissipation. The heating trace is connected across a voltage potential under the control of the control electronics 112. First and second thermistor traces extend from pins on the thermistor to the control electronics to provide temperature feedback for maintaining the heat spreader 38*a* at a substantially constant temperature.

The top surface of the heating portion is secured to the bottom surface of the bottom heat spreader 38*a* using, for example, a pressure sensitive adhesive. With the temperature control structure 40*a* mounted to the bottom heat spreader, heat dissipation from the resistive heating trace is thermally coupled to the heater spreader 38*a* in an efficient manner. The thermistor 64 extends into a window 138 formed through the bottom heat spreader 38*a*. To enable accurate measurement of the temperature, the thermistor 64 may be thermally coupled to the heat spreader 38*a* by an epoxy.

The fiber 18 is securely fixed to the housing by the strain relief assemblies 116, 118 and the glass capillaries 46, 48. The strain relief assemblies 116, 118 may be epoxied or otherwise secured to their associated grooves in the top and bottom housing portions. The fiber segment 16 is thus disposed loosely in the slot 114 to allow bending or rotation of the segment, while the ends 12, 14 of the segment are fixed to the housing by the capillaries, which are disposed within the strain relief assemblies. In the package 110, the slot 114 may have a straight portion 140 and an arcuate portion 142. The arcuate portion 142 may have greater width then the straight portion 140 to allow for bending or flexing of the fiber segment 16 disposed therein. The grating 22 formed in the segment 16 is disposed in the straight portion of the slot directly above the thermistor 64. As shown, the thermistor 64, the window 138 and the grating 22 are therefore centrally positioned relative to the heat spreader 38a.

As shown for example in FIG. 10 the assembly is completed with the top insulating housing portion 32a disposed over and in engagement with corresponding surfaces of the bottom insulating housing portion 34a. The strain relief assemblies 116, 118 with the capillaries 46, 48 disposed therein are thus positioned in corresponding capillary slots in the top and bottom insulating housing portions. The top insulating housing portion and bottom insulating housing portion may be joined using an epoxy to securely enclose the heat spreaders 38a, the fiber segment 16, and the temperature control structure 40a. The capillaries isolate the fiber segment 16 from axial strain imposed from outside the package, and the j-shaped bend in fiber segment 16 allows the segment to bend or rotate in response to relative movement between the capillaries, thereby substantially reducing axial strain related to such movement. Bragg wavelength variations in the grating 22 resulting from axial strain are thus substantially reduced.

The control electronics 112 are configured to supply a controlled input to the trace resistive element based on temperature feedback in the form of sensed resistance across the thermistor 64. A substantially constant temperature in the area of the grating 22 is thus maintained to substantially reduce temperature-related Bragg wavelength variations. Those skilled in the art will recognize that the control electronics can be realized in a variety of embodiments.

Figure 11:
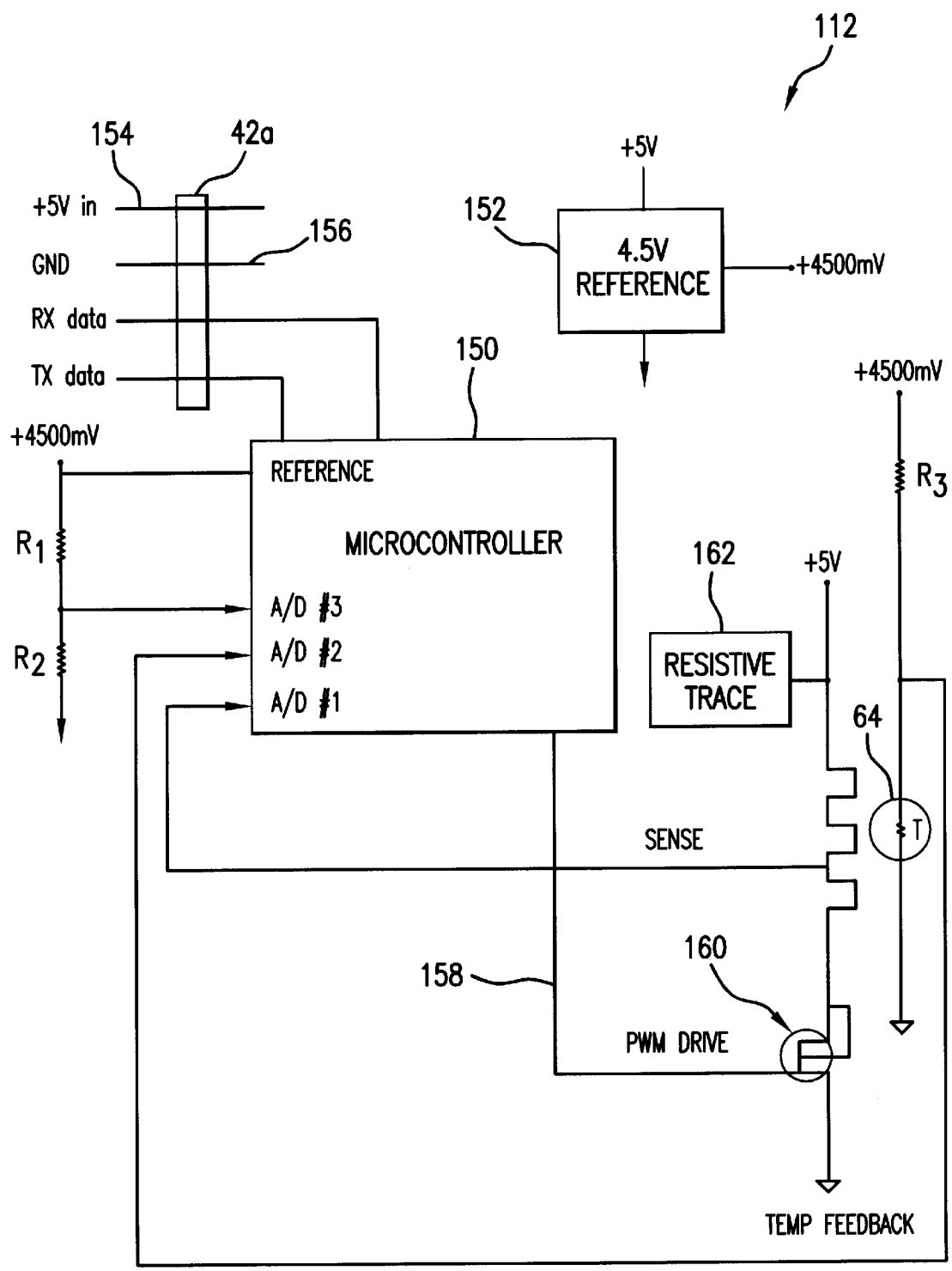
FIG. 11: is a block diagram of exemplary control electronics useful in connection with a grating package consistent with the present invention.

An exemplary configuration of the control electronics 112 is illustrated in FIG. 11. As shown, the electronics may include a commercially available microcontroller 150. A reference input to the controller may be connected to the output of a 4.5V reference circuit 152 which establishes a stable 4.5V reference based on a 5V input provided between a 5V input lead 154 and a GND lead 156 on the input/output connector 42a. The 4.5V reference may be connected across a voltage divider defined by the series connection of R1 and R2. The voltage divider establishes a known reference voltage depending on the values of R1 and R2, which may be coupled to an analog input, A/D #3, of the microcontroller 150.

Another analog input, A/D #2, to the microcontroller may be coupled to a second voltage divider defined by R3 and the thermistor 64. It will be recognized that the variable resistance of the thermistor will establish a temperature-dependent, temperature feedback voltage at the analog input, A/D #2. The microcontroller may be configured to compare the reference voltage at the analog input A/D #3 with the temperature feedback voltage at the analog input A/D #2, and provide an output on line 158 to a pulse width modulation (PWM) drive 160.

The output of the PWM drive 160 is coupled to the resistive trace 162 on the temperature control structure 40a, and to analog input A/D #1 of the controller for providing feedback relative to the state of the PWM output. When a difference between the reference voltage on A/D #3 and the temperature feedback voltage on A/D #2 exists, the controller 150 provides an output on line 150 to adjust the PWM output and thereby heat the heat spreader. As the temperature of the heat spreader increases, the resistance across the thermistor changes. The controller enables the PWM output until the resistance established by the thermistor establishes a temperature feedback voltage that is substantially the same as the reference voltage. A substantially constant temperature determined by the values of R1 and R2 is thus maintained by the electronics.

Transmit and receive leads on the input/output connector 42a may also be coupled to transmit and receive ports on the microcontroller to provide data communication to and from the controller. The microcontroller can be appropriately programmed to establish a user-defined grating temperature based on received data, and can provide temperature data, alarm conditions, etc. Again, those skilled in the art will recognize that the control electronics may be realized in a variety of embodiments. Also, the control electronics can be positioned externally from the package, as in the embodiment illustrated in FIGS. 2–7 for example, with only minor changes to the traces on the temperature control structure and the leads of the input/output connector.

There is thus provided a fiber grating package, which substantially reduces Bragg wavelength variations resulting from axial strain on a fiber. Consistent with the invention, a fiber segment including a Bragg grating is fixed between two points separated by a distance less than the length of the segment therebetween. As a result, the grating is bent to include at least one arcuate portion that bends or rotates in response to changes in the relative positions of the ends of the fiber segment. Temperature-related wavelength variations may be obviated by heating the grating to a stable desired temperature using electronic control and temperature feedback. Electronic control can be internal or external to the package depending size requirements for the package.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. A fiber grating package comprising
   a housing,
   a segment of optical fiber with a Bragg grating region formed therein, said segment having a first end fixed in a first location on said housing and a second end fixed in a second location on said housing, the shortest distance between said first location and said second location being less than the length of said segment, said segment with the Bragg grating thereon thereby being slack and bent into an arcuate shape between said first and second locations;
   a temperature control structure disposed at least partially in said housing;
   wherein the fiber grating package imparts substantially zero axial strain on the Bragg grating region over a range of temperatures.

2. A fiber grating package according to claim 1, wherein said first and second ends are fixed in said first and second locations by respective glass capillaries.

3. A fiber grating package according to claim 2, wherein said housing includes top and bottom housing portions, and wherein each of said capillaries is disposed in a respective slot formed in said bottom housing portion and an associated respective slot in said top housing portion.

4. A fiber grating package according to claim 2, wherein each of said glass capillaries are disposed within respective strain relief assembly, said glass capillaries being fixed to said housing by said strain relief assemblies.

5. A fiber grating package according to claim 4, wherein said housing includes top and bottom housing portions, and wherein each of said strain relief assemblies is disposed in a respective slot formed in said bottom housing portion and an associated respective slot in said top housing portion.

6. A fiber grating package according to claim 1, wherein said segment is disposed in a slot formed in said housing.

7. A fiber grating package according to claim 6, wherein said housing includes a top housing portion and a bottom housing portion, and wherein said slot is formed in said top housing portion.

8. A fiber grating package according to claim 7, wherein said slot is a j-shaped slot.

9. A fiber grating package comprising:
   a housing,
   a temperature control structure disposed at least partially in said housing, said temperature control structure having a resistive heating trace disposed thereon;
   a heat spreader thermally coupled to said resistive heating trace,
   a segment of optical fiber with a Bragg grating region formed therein, said Bragg grating region being disposed adjacent said heat spreader, said segment having a first end fixed in a first location on said housing and a second end fixed in a second location on said housing, the shortest distance between said first location and said second location being less than the length of said segment, said segment with the Bragg grating thereon thereby being slack and bent into an arcuate shape between said first and second locations;
   wherein the fiber grating package imparts substantially zero axial strain on the Bragg grating region over a range of temperatures.

10. A fiber grating package according to claim 9, wherein said first and second ends are fixed in said first and second locations by respective glass capillaries.

11. A fiber grating package according to claim 10, wherein said housing includes top and bottom housing portions, and wherein each of said capillaries is disposed in a respective slot formed in said bottom housing portion and an associated respective slot in said top housing portion.

12. A fiber grating package according to claim 9, wherein each of said glass capillaries are disposed within respective strain relief assembly, said glass capillaries being fixed to said housing by said strain relief assemblies.

13. A fiber grating package according to claim 12, wherein said housing includes top and bottom housing portions, and wherein each of said strain relief assemblies is disposed in a respective slot formed in said bottom housing portion and an associated respective slot in said top housing portion.

14. A fiber grating package according to claim 9, wherein said segment is disposed in a slot formed in said housing.

15. A fiber grating package according to claim 14, wherein said housing includes a top housing portion and a bottom housing portion, and wherein slot is formed in said top housing portion.

16. A fiber grating package according to claim 14, wherein said slot is a j-shaped slot.

17. A fiber grating package according to claim 9, wherein said segment is disposed within a slot formed in said heat spreader.

18. A fiber grating package according to claim 17, wherein said slot is an s-shaped slot.

19. A fiber grating package according to claim 9, wherein said heat spreader and a portion of said temperature control structure including said resistive heating trace are disposed in an associated pocket in said bottom housing portion.

20. A fiber grating package according to claim 9, wherein said temperature control structure includes conductive traces for connecting said resistive heating trace to control electronics for controlling current flow through said resistive heating trace.

21. A fiber grating package according to claim 20, wherein said temperature control structure includes a thermistor disposed thereon, said control electronics being configured to control said current flow based on a resistance across said thermistor.

22. A fiber grating package according to claim 21, wherein said thermistor is disposed on a portion of said temperature control structure disposed below said heat spreader, said thermistor extending into a window formed in said heat spreader adjacent said Bragg grating region.

23. A fiber grating package according to claim 21, wherein said control electronics are disposed on said temperature control structure.

24. A fiber grating package according to claim 9, wherein said resistive heating trace is electrically connected to control electronics for controlling current flow through said resistive heating trace.

25. A fiber grating package according to claim 9, wherein said temperature control structure is dispose entirely within said housing.

* * * * *